United States Patent

Poon et al.

[11] Patent Number: 6,038,041
[45] Date of Patent: Mar. 14, 2000

[54] THREE-DIMENSIONAL HOLOGRAPHIC FLUORESCENCE MICROSCOPE

[75] Inventors: Ting-Chung Poon, Blacksburg; Bradley Schilling, Yorktown; Guy Indebetouw; Brian Storrie, both of Blacksburg, all of Va.

[73] Assignee: Virginia Tech Intellectual Properties, Inc., Blacksburg, Va.

[21] Appl. No.: 09/154,313

[22] Filed: Sep. 16, 1998

Related U.S. Application Data

[60] Provisional application No. 60/059,174, Sep. 17, 1997.

[51] Int. Cl.$^7$ .............................. G03H 1/00; G02B 21/06; G01N 21/86; G06K 9/76
[52] U.S. Cl. ................................. 359/1; 359/30; 359/385; 250/559.4; 382/210
[58] Field of Search ..................................... 359/385, 389, 359/30, 1, 10; 356/345–347; 382/210; 250/559.4, 559.44, 458.1

[56] References Cited

U.S. PATENT DOCUMENTS

| | | | |
|---|---|---|---|
| 4,827,125 | 5/1989 | Goldstein | 350/234 |
| 5,064,257 | 11/1991 | Shinoda et al. | 350/458.1 |
| 5,556,790 | 9/1996 | Pettit | 436/172 |

*Primary Examiner*—Cassandra Spyrou
*Assistant Examiner*—Fayez Assaf
*Attorney, Agent, or Firm*—Whitham, Curtis & Whitman

[57] ABSTRACT

An optical scanning holography system which requires only a two dimensional scan to record three dimensional information from a fluorescent specimen wherein the optical scanning holography is based on scanning the specimen with a Fresnel zone pattern and detecting and decoding the fluorescent light reflected from the specimen. The flourescent light reflected from the specimen contains three dimensional information about the specimen so that once the fluorescent light is detected and decoded a three dimensional image of the specimen can be obtained and displayed using only the two dimensional scan.

15 Claims, 10 Drawing Sheets

THREE-DIMENSIONAL HOLOGRAPHIC FLUORESCENCE MICROSCOPE

This application claims the benefit of U.S. Provisional Application No. 60/059,174 filed on Sep. 17, 1997.

This invention was made using funds from grants 427516 and 427543 issued by the National Science Foundation, and the U.S. Government may have certain rights in the invention described in this patent.

BACKGROUND OF THE INVENTION

1. Field of the Invention

The invention is generally related to optical scanning holography and, more particularly, to a system which requires only a two dimensional scan to record three dimensional information.

2. Background Description

A recent major innovation in light microscopy is the use of fluorescent dyes as selective stains or markers in living cells. These dyes were originally employed by biologists to improve contrast and resolution, and are now being used in conjunction with laser scanning and confocal microscopy techniques to obtain three-dimensional (3-D) images. The advantages of fluorescent techniques in light microscopy are well known. At magnification levels sufficiently high to image single cells clearly, most biological structures are colorless and transparent. In the absence of some mechanism to improve the contrast in such a specimen, important features may remain invisible. Traditionally, selective staining has been used to darken or color certain aspects of a specimen. However, as with the electron microscope, this type of specimen preparation frequently kills living cells. Fluorescence microscopy has been successful at marking features of living cells and thus improving resolution and specificity.

Currently, many of the principal 3-D microscopy techniques involve sectioning and reconstitution. The approach is to take a series of sections through the sample at different depths, image and then merge the information into a single, 3-D image. The required 3-D scan is the major drawback of these methods. The 3-D scanning process is time consuming and requires very precise mechanical positioning. In addition, an immense amount of data must be stored and manipulated in order to reconstruct the image numerically in three dimensions.

Holographic recording using an active optical heterodyne scanning technique was first suggested by Poon and Korpel in 1979 and subsequently analyzed by Poon in 1985. In recent years, real-time holography using an active optical heterodyne scanning technique for recording and electron-beam-addressed spatial light modulator-based reconstruction has been extensively studied and demonstrated. Recording and real-time reconstruction of two dimensional objects has been reported, and the 3-D imaging capability of the technique has been demonstrated.

U.S. Pat. 5,064,257 discloses an optical heterodyne scanning type device.

SUMMARY OF THE INVENTION

The invention is an alternate approach to three-dimensional (3-D) fluorescence microscopy based on the holographic recording technique called optical scanning holography (OSH). OSH is an incoherent holographic recording technique that is based on scanning the fluorescent specimen with an interference pattern known as a Fresnel zone plate (FZP). To improve sensitivity, the FZP scanning field is temporally modulated to allow for heterodyned detection. The FZP pattern is scanned over the specimen which fluoresces in accordance with the scanning pattern. The fluorescent radiation is collected with a photomultiplier tube (PMT). Optical filters are used to separate the illumination light from the fluorescent light as in standard fluorescence imaging. Because an interference pattern is used to scan the specimen, (instead of simply a uniform beam as in standard optical microscopy or focused light as in laser scanning and confocal microscopy), the resulting PMT current contains 3-D holographic information of the object. When the PMT current is demodulated and synchronized with the scanning signals, the hologram is recorded and stored as an image file in the computer. Numerical processes are used to reconstruct the image of the fluorescent object.

The present invention, therefore, offers at least the following advantages over existing techniques: Most commonly used methods for three-dimensional fluorescence microscopy make use of sectioning techniques which require that the object be physically scanned in a series of two dimensional (2-D) sections along the z-axis. The main drawback in these approaches is the need for these sequential 2-D scans. This type of scanning is time consuming and requires very precise mechanical positioning. In cases where photobleaching is a concern, repeated 2-D sectioning only exacerbates this problem. In addition, an immense amount of data must be stored and manipulated in order to reconstruct the image numerically in three dimensions. Since our approach is based on a holographic recording technique, this system requires only a 2-D scan to record 3-D information. Once the hologram is recorded with a single 2-D raster scan, all the depth information is stored. The depth information can be retrieved numerically by "dialing in" the reconstruction plane (in the depth dimension) and calculating the reconstructed image at the desired plane. We routinely reconstruct 50–100 images from a single hologram and use commercial software to combine these images serially into a "movie. " Using the PC, we can then leaf through the images in sequence to obtain the plane of interest.

Fluorescence microscopy is a major field of research which has become an industry in itself. It is of particular importance in biological imaging because live cells can be stained with fluorescent dyes, improving image contrast and resolution. All existing uses and markets for fluorescence microscopy apply to our technique. We offer an alternate approach boasting faster recording of 3-D data, lower memory overhead, and a potential improvement in photobleaching.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

We have developed and investigated an alternate approach to the 3-D imaging problem based on optical scanning holography (OSH). We propose a new technique which combines the 3-D imaging capability of optical scanning holography with the advantages of fluorescence techniques. This research, which brings these ideas together for the first time, will lead to the first fluorescent optical scanning holographic microscope.

An attractive quality of holography is the inherent ability to store 3-D information in a 2-D array without a depth scan. Optical scanning holographic microscopy makes use of this inherent advantage and only a single 2-D scan of a thick specimen is required to record 3-D information. This results in significant time savings in data acquisition and a savings in data storage.

Figure 1:
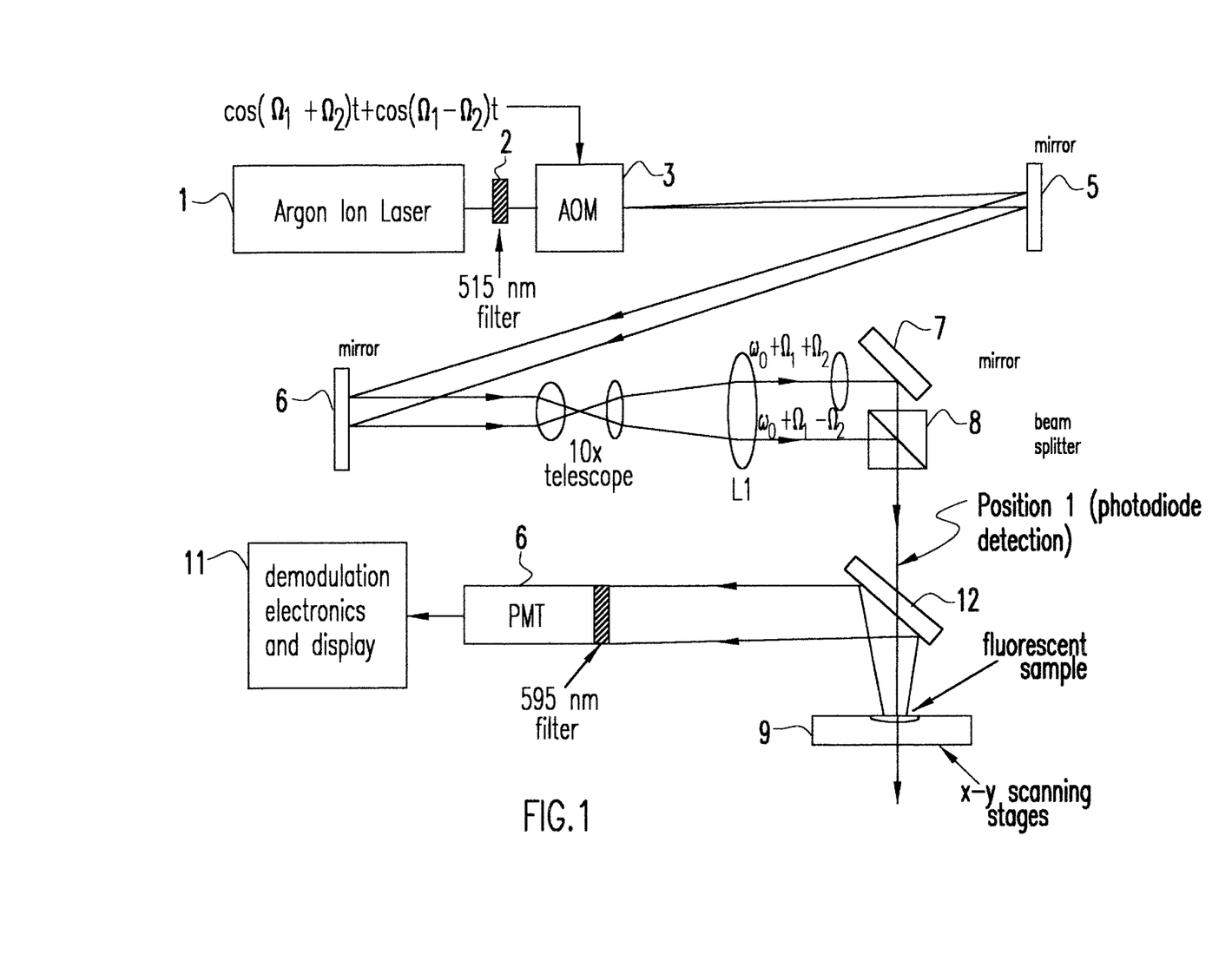
FIG. 1 is a block diagram of the optical experimental setup used to record the hologram of a fluorescent specimen by optical scanning holography.

Optical Scanning Holography (OSH) is based on scanning the object with a Fresnel zone pattern (FZP). The FZP is generated by superimposing a plane wave with a spherical wave from the same laser 1 as shown in FIG. 1. The 3-D location of the scatterer is encoded in the position and size of the FZP. For heterodyne detection, the FZP is temporally modulated by using two interfering waves at different temporal frequencies adjusted by acousto-optic devices. In standard OSH the laser beam of frequency $\omega_0$ is directed through an acousto-optic modulator 3 (AOM) operating in the Bragg regime. At the output of the AOM, angularly separated light beams at $\omega_0$ and $\omega_0+\Delta\Omega$ are accessible, where $\Delta\Omega$ is the operating frequency of the AOM. The beams are spatially separated and expanded into two parallel beams. A lens L2 is placed in one of the beams to form the spherical wave which is then combined colinearly with the other beam. The resulting interference pattern is the FZP laser field mathematically represented by $$I(x, y, z; t) = A^2 + B^2 + 2AB\sin\left(\frac{k_0}{2z}(x^2 + y^2) - \Delta\Omega t\right) \quad (1)$$

In equation (1), $A^2$ and $B^2$ are the initial intensities of the light beams, $k_0=\omega_0/c$ is the wavenumber of the laser light, c is the speed of light, and z is the axial distance measured from the focus of the spherical wave. This interference pattern is scanned over the object with intensity transmittance or reflectance $|\Gamma(x,y,z)|^2$ and the transmitted or reflected light is collected by a detector such as a photomultiplier tube 10 (PMT). The scanning action results in the spatial convolution of the scanning field intensity and the object, thus encoding each object scatterer by a FZP.

Some insight into the OSH process may be gained by taking a simple example. Let the object transmittance be a single scatterer $|\Gamma|^2=\delta(x-x_0, y-y_0, z-z_0)$. The resulting heterodyned output current from the PMT at frequency $\Delta\Omega$ is proportional to $$i_\Omega(x, y; z_0, t) = \sin\left(\frac{k_0}{2z_0}((x-x_0)^2 + (y-y_0)^2) + \Delta\Omega t\right) \quad (2)$$

This current contains the holographic information pertaining to the off-axis point object. In order to extract this information, the signal is electronically multiplied by sin ($\Delta\Omega t$) and lowpass filtered. The resulting demodulated signal $i_d$, $$i_d(x, y) \alpha \cos\left(\frac{k_0}{2z_0}((x-x_0)^2 + (y-y_0)^2)\right) \quad (3)$$

contains the location ($x_0$, $y_0$) as well as the depth ($z_0$) information of the point object. To preserve and record the phase of $i_d$, a dc bias signal is added. The resulting signal is a hologram of the off-axis point source object:

$$t(x,y)=i_d(x,y)+\text{bias} \quad (4)$$

This hologram can be displayed on a television monitor or sent to a video digitizer 11 to be converted to a digital image for storage and/or processing. The 3-D object can then be reconstructed from the hologram either optically or digitally, and slices at chosen depths can be reconstructed individually by convolving the holographic information with a FZP of appropriate size.

Two important features of the OSH technique need to be emphasized. First, the 3-D information of the object is recorded using a single 2-D scan. Second, although the FZP is produced with laser light, the method is incoherent. The hologram contains information of the object intensity variations only and is insensitive to its phase variations. This feature is essential in the practice of the present invention since it allows the holographic recording of not only transmitting or reflecting objects but of fluorescent objects as well. Also noteworthy is the fact that in OSH, the bias as well as twin image can be conveniently removed by electronic means. This contrasts with other noncoherent techniques which are plagued by a rapid bias buildup when the object consists of more than a few point scatterers.

A fluorescent molecule is one that absorbs a photon and quickly re-emits a photon of lower energy, and thus longer wavelength. For instance, the dye fluorescein absorbs light at a peak wavelength of 490 nm and in response emits light around 525 nm. The availability of rotational and translational energy states makes this phenomena possible at many wavelengths for both absorption and emission. As absorption and emission spectra show, this results in broad excitation and emission bands rather than sharp lines. It is the difference between the peaks in the excitation and emission spectra (known as the Stokes shift) that makes fluorescence dyes useful in microscopy. Wavelength selective filters are employed in the illumination and viewing stages of the microscope to separate and collect the desired fluorescent emission from the undesired excitation light. A dye which exhibits a large Stokes shift allows for a greater ability to block unwanted radiation and collect fluorescent emission which results in improved performance. Two parameters which are particularly important to this application are the fluorescent lifetime and quantum efficiency associated with a molecule. The fluorescent lifetime is defined as the average amount of time the molecule remains in the excited state prior to its return to the ground state. The quantum efficiency is the ratio of the energy emitted to the energy absorbed.

It has been shown above that the FZP laser field is generated by superimposing a plane wave with a spherical wave from the same laser but with a slightly different temporal frequency, resulting in an FZP which is temporally modulated. To apply OSH to fluorescent specimens, the FZP is generated at a wavelength near the peak absorption of the specimen and used as the heterodyned excitation field. If the fluorescence lifetime of the specimen is short enough, the fluorescence response is also temporally modulated, allowing its heterodyne detection.

The frequency difference produced by a standard AOM is $\Delta\Omega/2\pi=40$ MHz or higher which was found unsuitable to excite the fluorescent specimen. Clearly, if the fluorescent lifetime of the sample is longer than the period of the excitation (25 ns for $\Delta/2\pi=40$ MHz), the fluorescent specimen will be unable to respond. Although many fluorescent dyes have lifetimes less then 10 ns, when a fluorescent sample is excited by a sinusoidal light field, the modulated emission is delayed in phase and the modulation index is smaller than that of the excitation. The higher the frequency of excitation, the lower the modulation depth. With fluorescent signal at a premium, we have elected to use a unique AOM configuration to allow for the use of a beat frequency close to 10 MHz.

Figure 2:
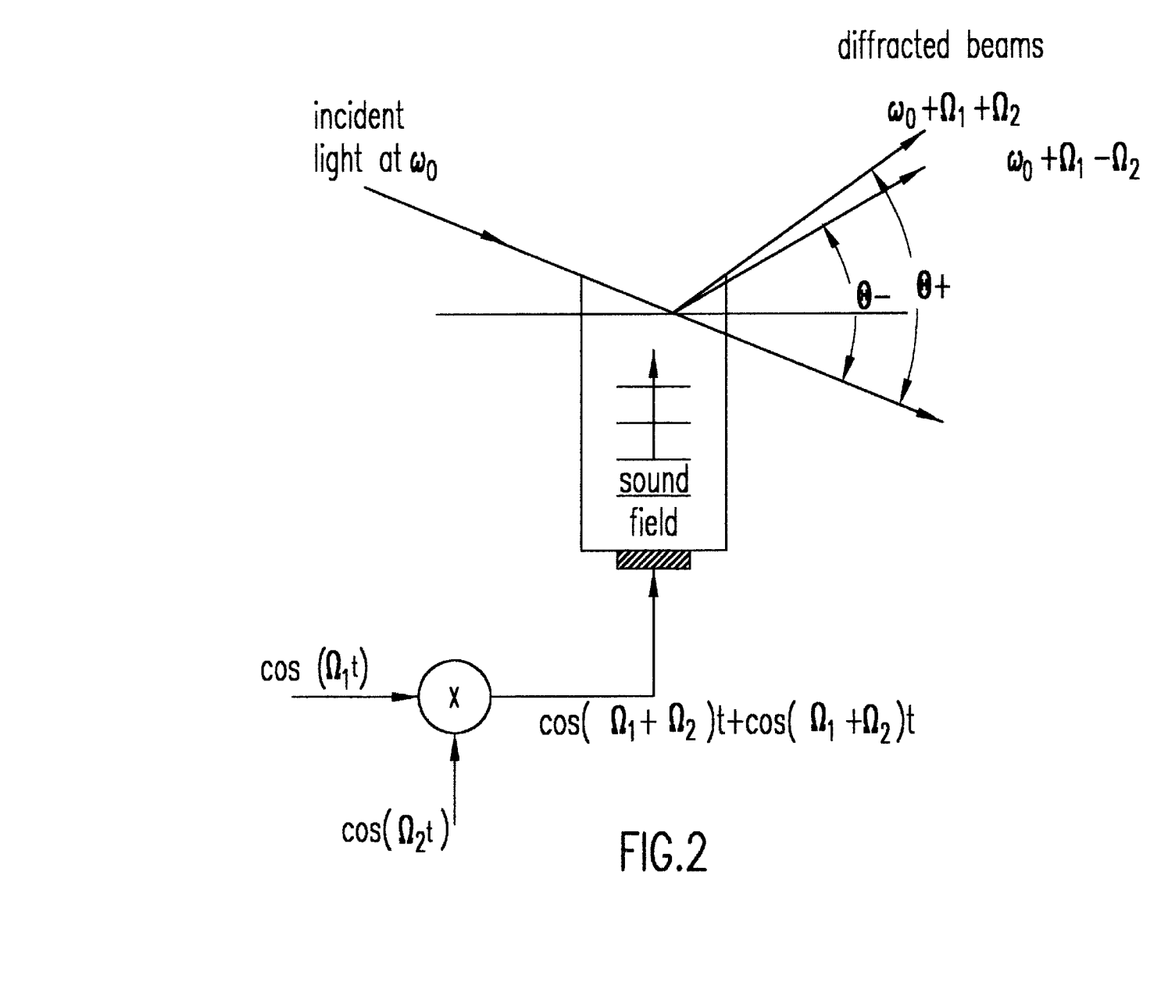
FIG. 2 is a schematic diagram of an acousto-optic modulator configuration for the generation of two light beams separated by a temporal frequency difference of $2\Omega_2$.

In order to make use of a commercially available 40 MHz AOM to generate two light beams separated in frequency by 10.7 MHz, we employ the innovative configuration shown in FIG. 2. (The choice of 10.7 MHz was dictated by the availability of electronics for filtering and amplification.) The setup is based on mixing signals prior to injection into the AOM which will result in radio frequencies separated by $\Delta\Omega/2\pi=10.7$ MHz and lying within the active region of the AOM. We use signals at $\Omega_1/2\pi=40$ MHz, and $\Omega_2/2\pi=5.35$ MHz. The resulting drive signal consists of two cosine signals separated by $\Delta\Omega$ according to $$\cos(\Omega_1 t) \times \cos(\Omega_2 t) = \tfrac{1}{2}(\cos(\Omega_1+\Omega_2)t+\cos(\Omega_1-\Omega_2)t) \quad (5)$$

As shown in equation (5), the multiplication of the cosine signals results in a drive signal made up of cosines at 45.35 MHz, and 34.65 MHz separated by the desired 10.7 MHz. Driving the AOM with this signal results in two 1st-order diffracted beams, with frequencies $$\omega \pm \omega_0(\Omega_1 \pm \Omega_2), \quad (6)$$

and angles of detection $$\Theta \pm = \left(\frac{\lambda_0}{2\pi V_s} \times (\Omega_1 \pm \Omega_2)\right), \quad (7)$$

respectively. In equation (7), $\lambda_0=2\pi c/\omega_0$ is the wavelength of the incident light, and $V_s$ is the speed of sound in the glass of the AOM. From equations (6) and (7) we see that the difference in temporal frequency between the two diffracted beams is $2\Omega_2/2\pi$ or 10.7 MHz, and the two beams are angularly separated by $2\Omega_2(\lambda_0/2\pi V_s)$. For our system, using Vs=4000 m/s and $\lambda_0$=515 mm, the angular separation is about 65 mrad (3.8°) which is sufficient to separate the two beams.

Figure 3:
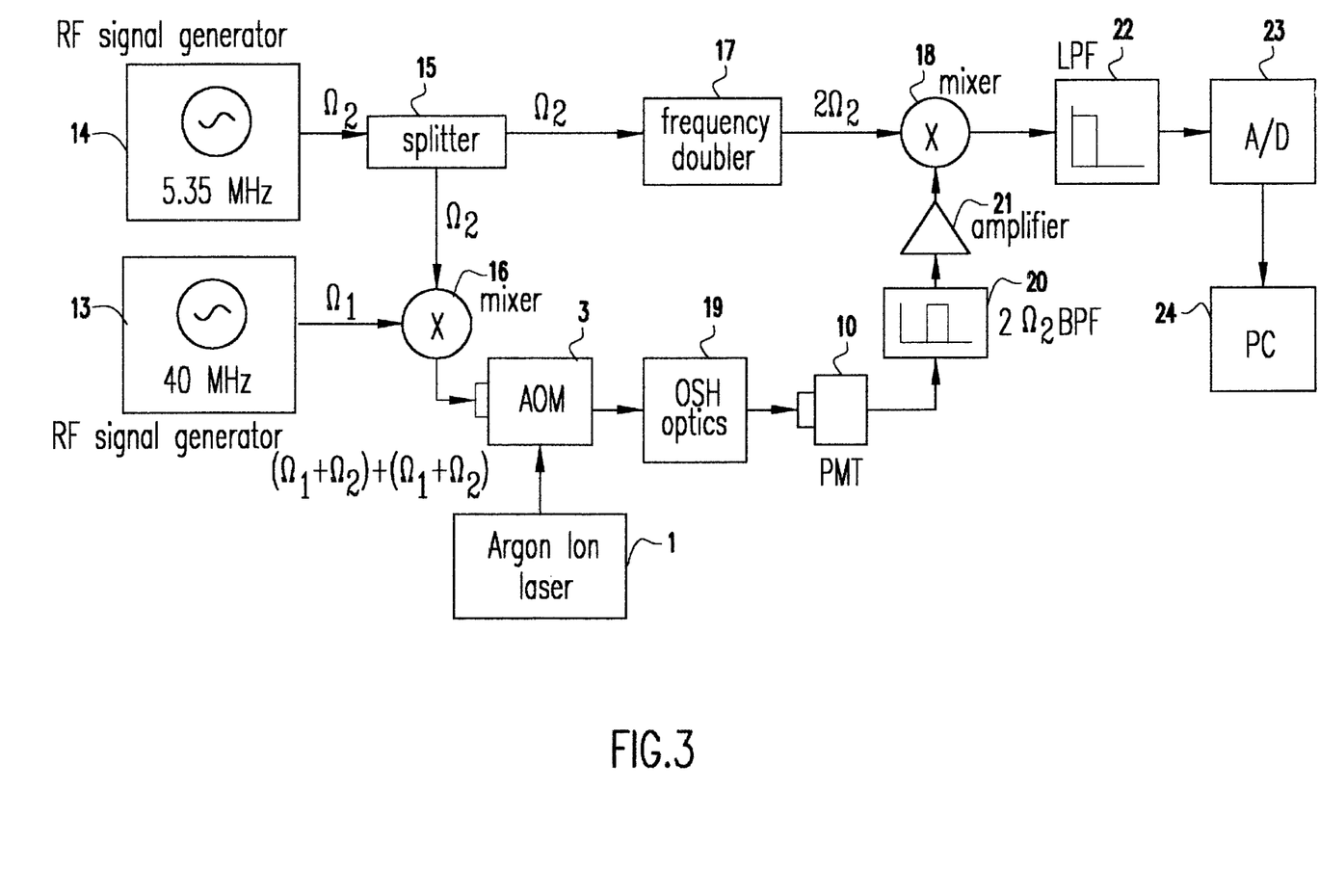
FIG. 3 is a block diagram of the electronics used to generate the AOM drive signals and demodulate the signal.

The experimental apparatus is described in FIGS. 1–3. FIG. 1 shows the optics which define the light path in OSH, FIG. 2 shows the acousto-optic interaction producing the two beams, while FIG. 3 shows the electronics used to generate and demodulate the signals necessary for the experiment.

Figure 4:
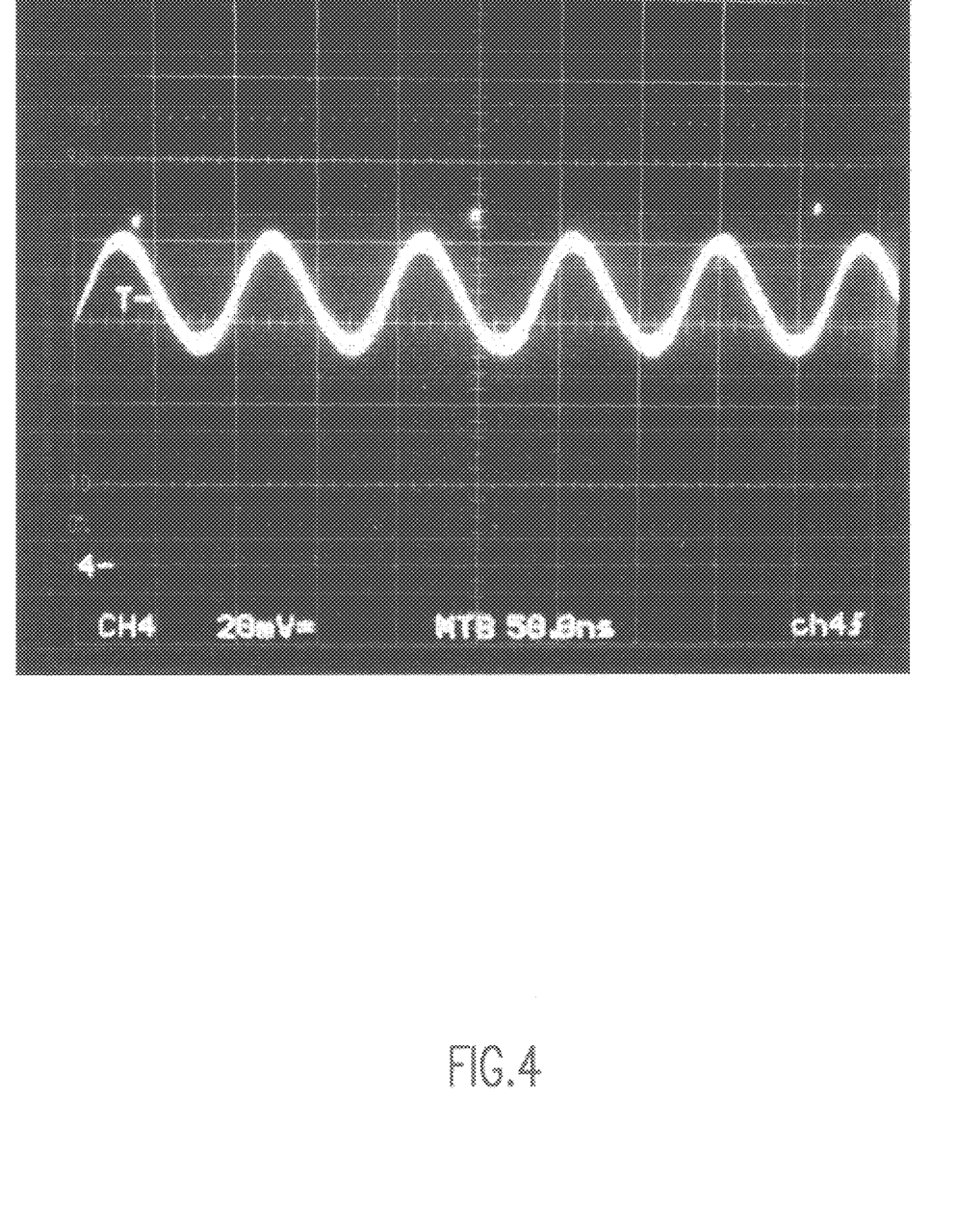
FIG. 4 is an oscilloscope trace showing the measured heterodyned laser field used to excite the fluorescent specimen (the scope is DC coupled with 0 volt DC level at the '4-' in the lower left hand corner, and the voltage scale is 20 mV/div and the time scale is 50 ns/div)

The 514 nm line of an air cooled, (40 mW) multi-line argon-ion laser 1 is selected by a narrow bandpass filter 2 placed immediately at the laser output. This radiation is incident on the Bragg cell of the AOM operating 3 as described in as previously described and shown in FIG. 2. This results in two beams separated in frequency by 10.7 MHz, and in angle by about 3.8°. In order to spatially separate the beams, they are bounced between two mirrors 5, 6 and expanded by a 10× telescope. The beams are then collimated and made parallel to each other by the long focal length lens, $L_1$. The first experiment consisted of checking the fluorescence response at the chosen frequency. To do this, the two plane waves are made colinear by the mirror 7 and the beamsplitter 8 and made to interfere on the specimen. The excitation field produced can be written as $$I(t) = A^2 + B^2 + 2AB\cos(\Delta\Omega t) \quad (8)$$

where $A^2$ and $B^2$ are the intensities of the two waves. This intensity, modulated at 10.7 MHz, measured by a photodiode at position 1 in FIG. 1 is shown in FIG. 4. The zero level in FIG. 4 is at the '4-' in the lower left hand corner. The reduced modulation depth is due to the unequal beam intensities caused by a nonuniform frequency response of the AOM and an unbalanced beam splitter. The large DC level may have detrimental consequences when used to excite fluorescence as it may saturate the sample, masking the modulated response. The dichroic filter 12 in FIG. 1 lets the light at 515 nm pass and excite the fluorescent sample.

Originally we had planned to use cells stained with ethidium bromide (EB) as a fluorescent sample. EB is excited by radiation in the band around 515 nm and has peak emission at 590 nm. This broad Stokes shift is one reason we selected EB. The filters used in our experiment, as shown in FIG. 2, reflect this choice of fluorescent dye. Unfortunately, when bonded to DNA the fluorescent lifetime of EB is in the 20 ns range. In addition, the quantum efficiency of EB is relatively low, below 50%. We also tested fluorescent beads with peak excitation at 530 nm and peak emission at 560 nm. These beads are promising specimens because they have a quantum efficiency near 100%, have broad excitation and emission bands and have fluorescent lifetime shorter than 10 ns.[10] Even with our slightly mismatched filters, the beads gave superior performance to the EB stained cells. For the first experiment, a drop of solution containing a high concentration of orange fluorescent beads was used as the fluorescent object.

Figure 5:
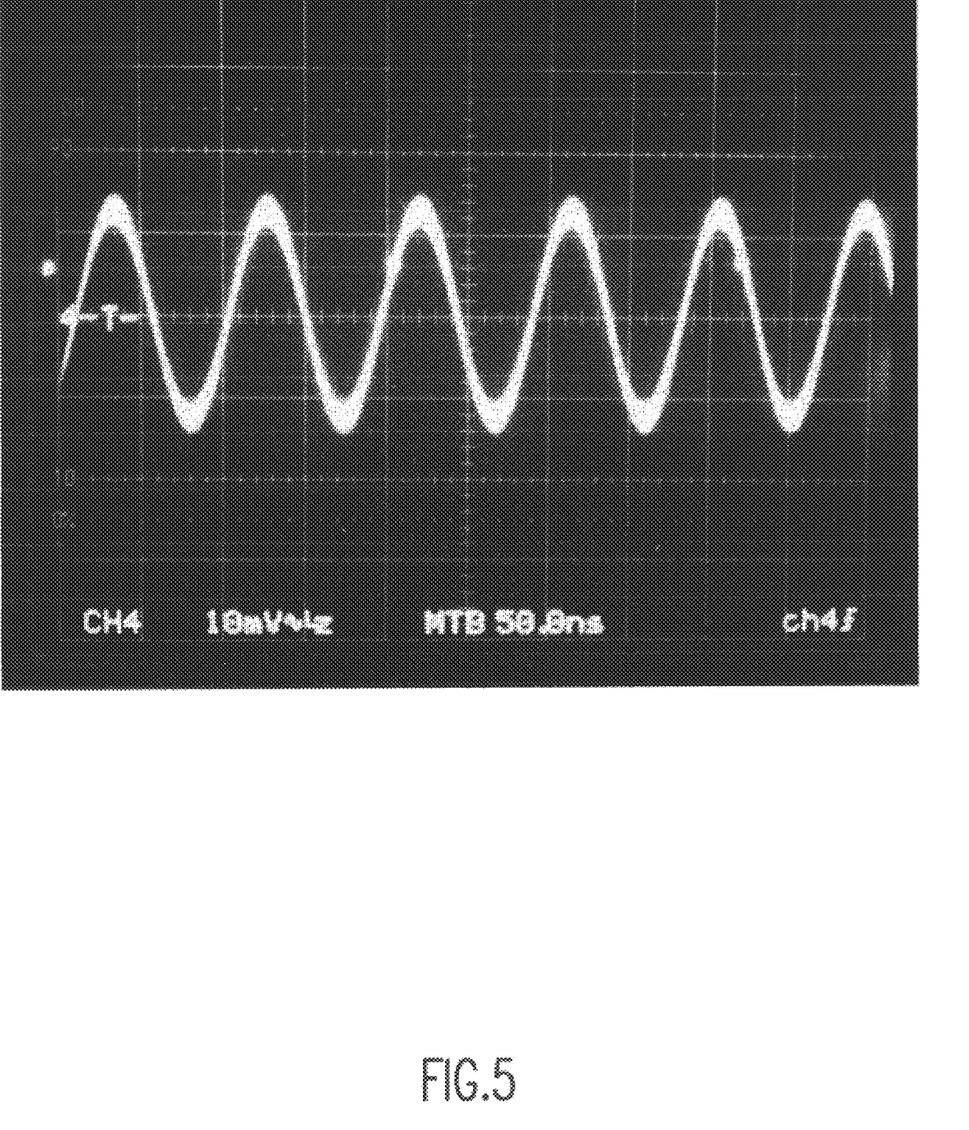
FIG. 5 is an oscilloscope trace showing the measured fluorescent response to the heterodyned laser excitation after filtering and amplification (the scope is AC coupled with 0 volt level at the center, the voltage scale is 10 mV/div and the time scale is 50 ns/div)

The fluorescent light, centered at 560 nm, is reflected by the dichroic filter 12, passes through a 595 nm narrow bandpass filter which is used to reject the background laser light at 515 nm, and into the photomultiplier tube 10 (PMT). Finally, the signal is electronically filtered and amplified at 10.7 MHz, as shown in FIG. 3, before being displayed on the oscilloscope 11. A resulting fluorescence signal due to the heterodyned excitation is shown in FIG. 5. The trace in FIG. 5 is AC coupled so the 0 volt DC level is in the center of the screen. These preliminary results show that the fluorescent dye-stained specimen responds to a heterodyned excitation field at 10.7 MHz and indicates that fluorescent holography by OSH is feasible.

To convert the setup for holographic recording, lens $L_2$ was put in place (FIG. 1) to produce at the sample a FZP excitation field modulated at $\Delta\Omega/2\pi=10.7$ MHz and represented mathematically by equation 1. The sample was scanned using a computer controlled x-y stage 9 and the fluorescent light collected by the PMT. The PMT current, given by equation 2 contains the three-dimensional information of the object as described above. This current is demodulated and synchronized with the x-y scanners as shown in FIG. 3 to produce an electronic hologram which is suitable for digital storage, processing, and reconstruction. The details of OSH in a non-fluorescent mode has been described in detail in the literature.

Referring to FIG. 3, radio frequency signal generator 13 operating at 40 MHZ and radio frequency signal generator 14 operating at 5.35 MHZ are used to generate the drive signal for the AOM shown in FIG. 1. A frequency doubler 17 is used to obtain the heterodyned frequency, 10.7 MHz, for demodulation. To avoid excess loading of the signal generator, a signal splitter 15 is used between the first mixer 16 and the frequency doubler. The light levels involved in fluorescense microscopy are very low, so a PMT 10 must be used to collect the light. The signal out of the PMT, already amplified appreciably, must undergo additional amplification and filtering to detect the heterodyned signal. Two bandpass filters 20 and two amplifiers 21 are used in the electrical path between the PMT and the demodulation mixer 18. The filters have a 10.5 MHZ center frequency. One filter is placed in the signal path between the PMT and the first amplifier, while the other is placed after the second amplifier. The demodulated current, now at baseband, is filtered by a low pass filter 22 to eliminate high frequency noise. The A/D board 23 acquires the hologram by converting the analog voltage out of the low pass filter to a digital signal in sync with the scanning signals.

The sample was a fluorescent line source obtained by drawing a small amount of solution containing a high concentration of orange fluorescent latex beads with a diameter of 15 $\mu$m into a hollow-core optical fiber with an inner diameter of approximately 136 $\mu$m. Prior to the experiment the object was viewed with a commercial fluorescence microscope showing that the fluorescent beads were tightly packed and filled the inner diameter of the fiber albeit nonuniformly.

Figure 6:
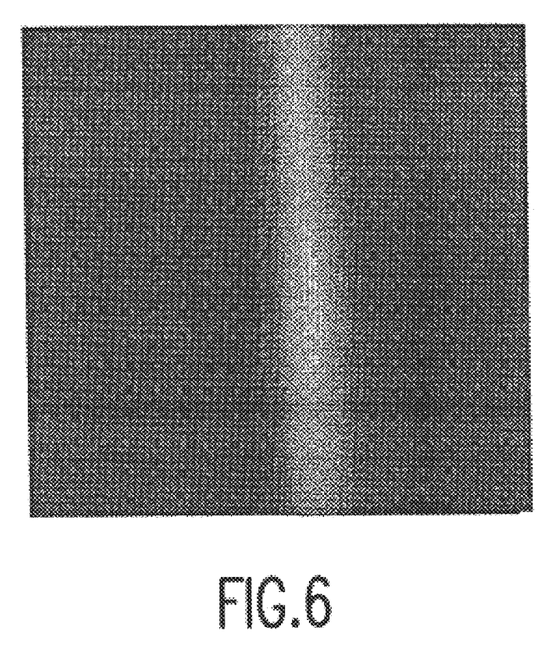
FIG. 6 is a scanned intensity image of a fluorescent line object (the object is a fluorescent bead filled hollowcore fiber with 136 μm inner diameter, and the image is a 256 level gray scale image consisting of 256×256 pixels (the area scanned is about 2.5 mm×2.5 mm))
Figure 7:
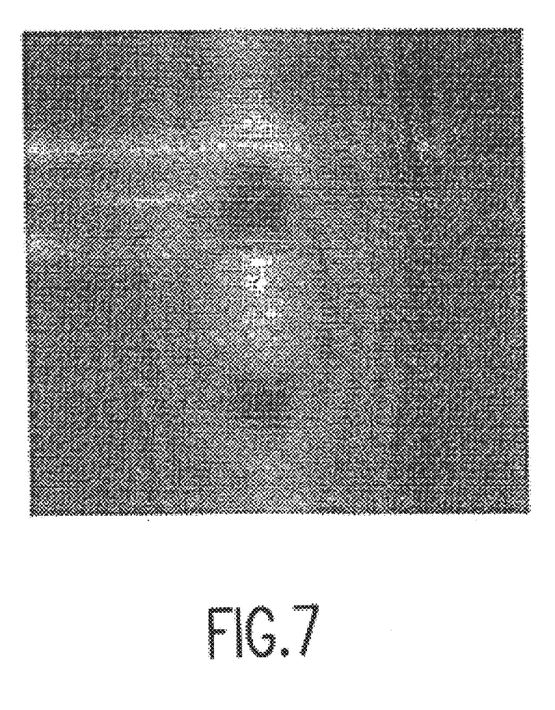
FIG. 7 is a hologram of the fluorescent line object recorded using OSH (the image is a 256 level gray scale image consisting of 256×256, and the area scanned is about 2.5 mm×2.5 mm)

A fluorescence image of the bead-filled fiber was obtained by scanning the specimen through a single focused beam in a raster fashion. The resulting fluorescence intensity was recorded by the PMT, digitized and displayed on the computer screen. The image shown in FIG. 6 is an array of 256×256 points displayed using 256 gray levels. The area scanned is approximately 2.5 mm×2.5 mm. The bright vertical strip is the fluorescent line. Finally, the entire OSH system, represented completely by FIGS. 1–3 was employed to record a hologram of the fluorescent specimen by scanning it slowly through the modulated FZP excitation filed in a raster fashion. The fluorescent light was collected by the PMT, amplified, filtered, and digitized. The resulting hologram is shown in FIG. 7, exhibiting the expected fringe pattern indicative of the holographic recording of a line object. The same scanning parameters were used in FIG. 6 as in FIG. 7.

Although heterodyne methods have been employed in the detection of weak fluorescence signals, to our knowledge no experiment has been conducted which uses a heterodyned light field to excite a fluorescent sample. We have generated a heterodyned excitation field at a frequency appropriate for a fluorescent sample and shown that the sample does respond to such a signal. To generate the excitation field, we have employed the unique AOM configuration previously discussed with reference to FIGS. 1–3 driven by a mixed radio frequency signal. The initial fluorescent setup was extended to that of an optical scanning holographic setup and a hologram of a fluorescent line object was successfully recorded. To our knowledge, this is the first hologram of a fluorescent object to be recorded by this technique.

One of the main advantages of a holographic approach to 3-D microscopy is the elimination of the 3-D scan. The 3-D scanning process is time consuming and requires very precise mechanical positioning. In cases where photobleaching is a concern, repeated 2-D sectioning only exacerbates this problem. In addition, an immense amount of data must be stored and manipulated in order to reconstruct the image numerically in three dimensions. The OSH approach to fluorescence microscopy is a solution to these major drawbacks, since only a single 2-D scan of a thick specimen is needed to record 3-D information. There is a significant improvement in data acquisition time, and less memory is required for data storage. Preliminary calculations show that the OSH technique will result in less photobleaching than standard techniques which require a 3 -D scan.

Figure 8:
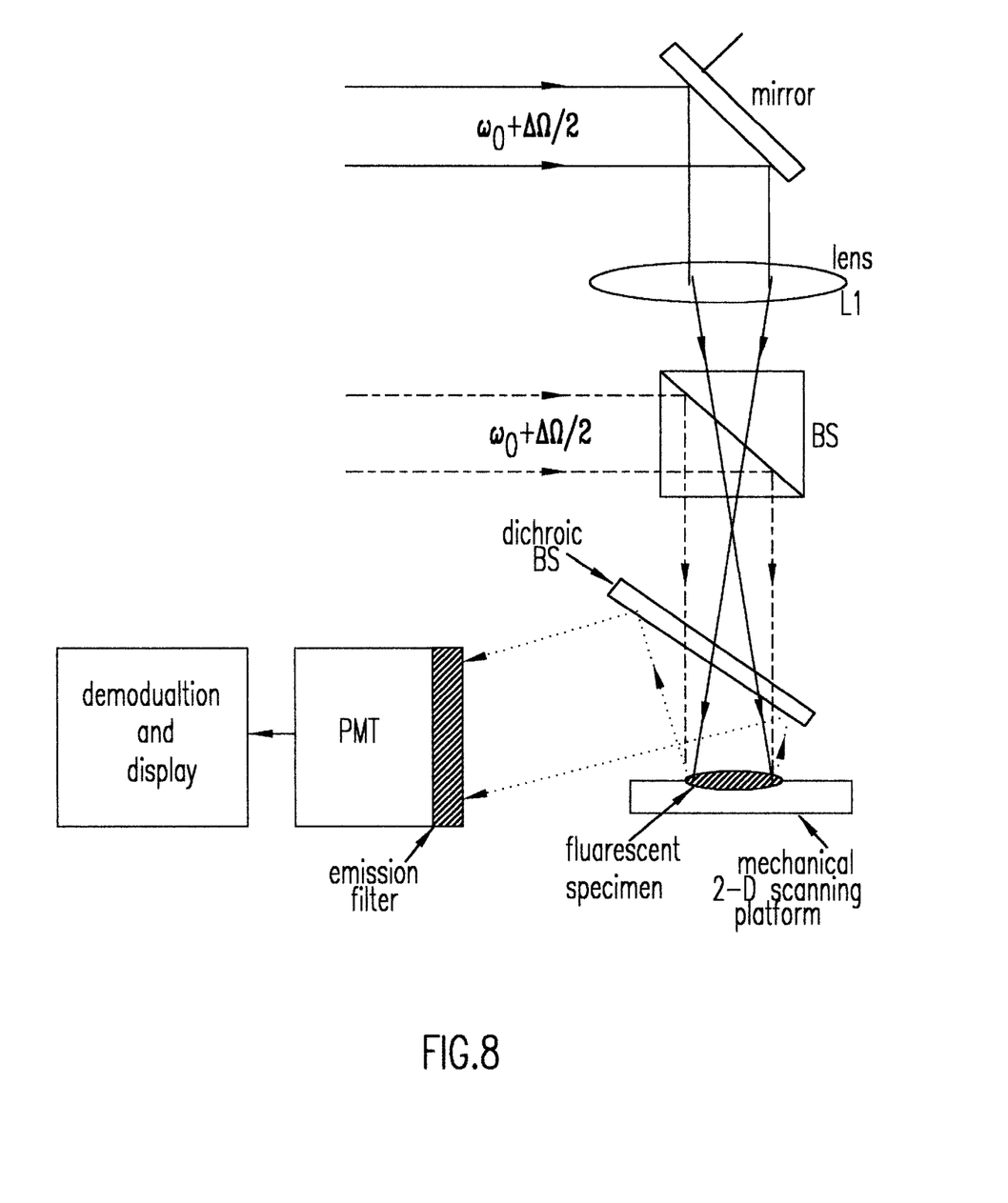
FIG. 8 is a block diagram of an optical experimental setup used to record the hologram of a fluorescent specimen by optical scanning holography.

A simplified block diagram of our experimental setup, shown in FIG. 8, shows two plane waves separated in frequency by $\Delta\Omega$. These plane waves originate from a multi-line argon-ion laser operating in conjunction with a line filter to select the 514 nm line, thus $\omega_0 = 2\pi c/\lambda = 3.667\times 10^{15}$ rad/sec. As discussed above in conjunction with FIGS. 1–7, the frequency shift in each beam is achieved by an acousto-optic modulator (AOM). The AOM is used in a configuration that splits the laser light into two beams separated in frequency by $\Delta\Omega=2\pi\times10.7$ MHz. The beams are then collimated and made parallel to each other as shown in FIG. 8. Lens L2, this time, is placed after mirror 7 in one of the beams to form the spherical wave which is then combined colinearly with the other beam at the beamsplitter (BS). The resulting interference pattern at the object, which is a distance z beyond the focus of the spherical wave, is the FZP laser field; The dichroic beamsplitter (T 514 nm/R 595 nm) lets light at 514 nm pass and excite the fluorescent object which fluoresces strongly around the center frequency of 560 nm. This light is reflected by the dichroic beamsplitter, passes through a 595 nm narrow bandpass filter (used to reject the background laser light at 514 nm), and into the PMT. The object is scanned through the FZP in a raster pattern using a computer controlled mechanical x-y scanning platform. The PMT current, which contains 3-D information of the object being scanned, is electronically filtered and amplified at 10.7 MHz, demodulated and digitized by a standard PC-based A/D board. This digitized intensity pattern is stored in a 2-D array in accordance with the scanning to produce the hologram.

Figure 9:
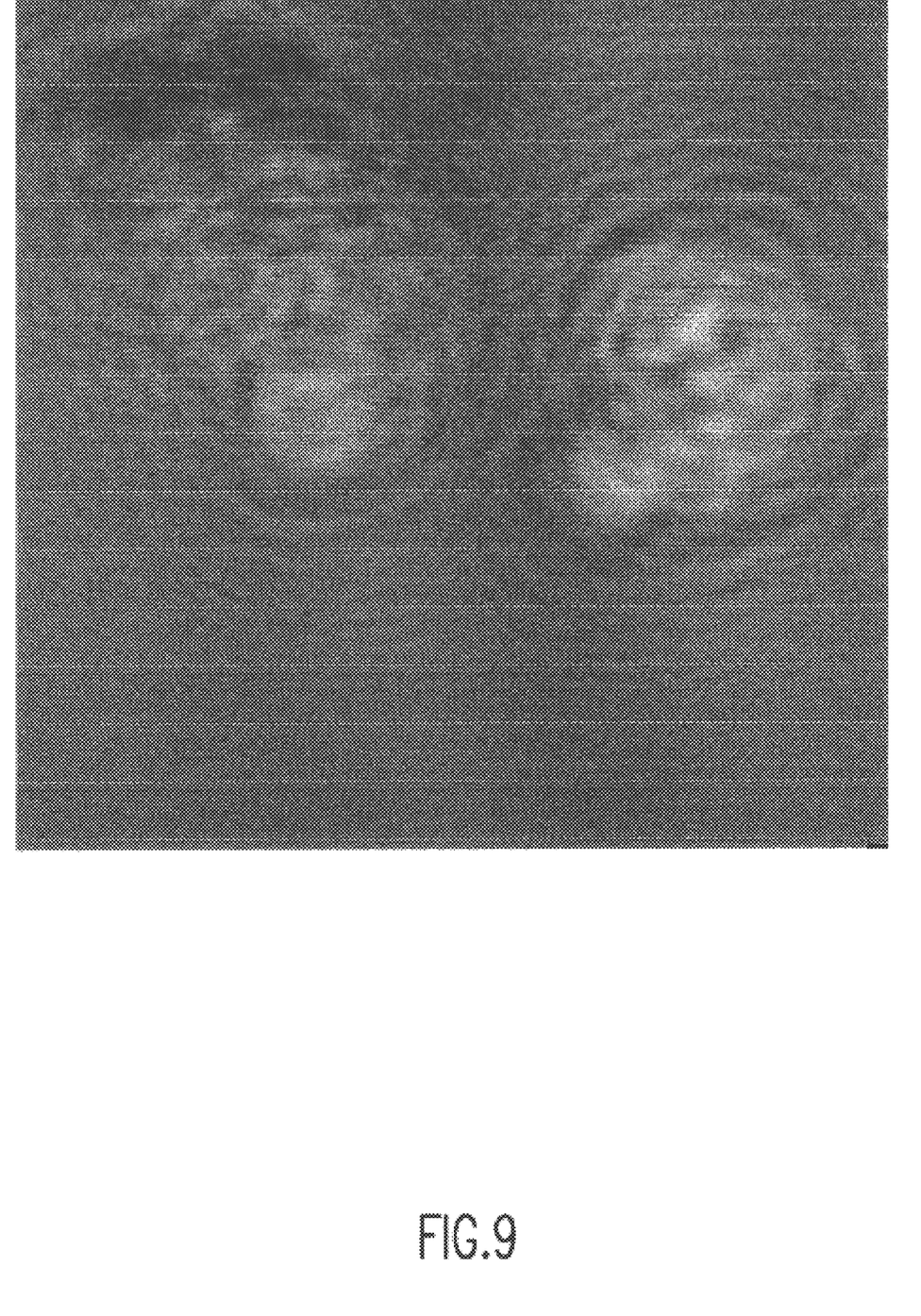
FIG. 9 is a hologram of fluorescent object recorded using OSH (the object consists of two drops of solution at different depths containing a high concentration of fluorescent latex beads; the image is a 256 level gray scale image consisting of 256×256 pixels; and the area scanned is about 2.0 mm×2.0 mm)

The fluorescent sample we used in the experiment was a solution containing a high concentration of fluorescent latex beads. The beads were 15 μm in diameter with peak excitation at 530 nm and peak emission at 560 nm. These beads made good experimental specimens because they have a quantum efficiency near 100%, have broad excitation and emission bands and have fluorescent lifetime shorter than 10 ns. In order to demonstrate the depth discriminating capability of the system, two drops of solution were placed in close proximity but at different z depths. A hologram of this fluorescent sample was recorded and is shown in FIG. 9. The two drops are easily distinguishable in the hologram. The two drops are separated in depth by approximately 2 mm, with the drop on the left at $z_0 \approx 30.0$ mm and the drop on the right at $z_1 \approx 32.0$ mm. The area scanned to produce the hologram is about 2 mm by 2 mm. The hologram is a 256 by 256 array with intensity level represented by 256 gray levels.

Once a hologram such as that shown in FIG. 9 has been recorded and stored, the 3-D image can be reconstructed either optically or numerically. Numerical image reconstruction is based on convolving the hologram with the free space impulse response corresponding to the desired depth z. From one hologram, different depth planes are numerically reconstructed, or brought into focus, by convolution with the appropriate impulse response for that depth. Once again we emphasize the difference between the holographic technique and standard 3-D imaging techniques. In optical sectioning methods, the image is brought into focus at a certain depth, say $z_0$, and the image for that plane is recorded and stored. However, this process must be repeated for as many planes in z as are desired, and an image must be recorded and stored for each plane. Usually there will be anywhere from 20 to hundreds of images recorded. With OSH, a hologram of the object is recorded and stored with a single 2-D scan. Since all the depth information is stored in the hologram, any desired image plane can be brought into focus during image reconstruction.

Figure 10:
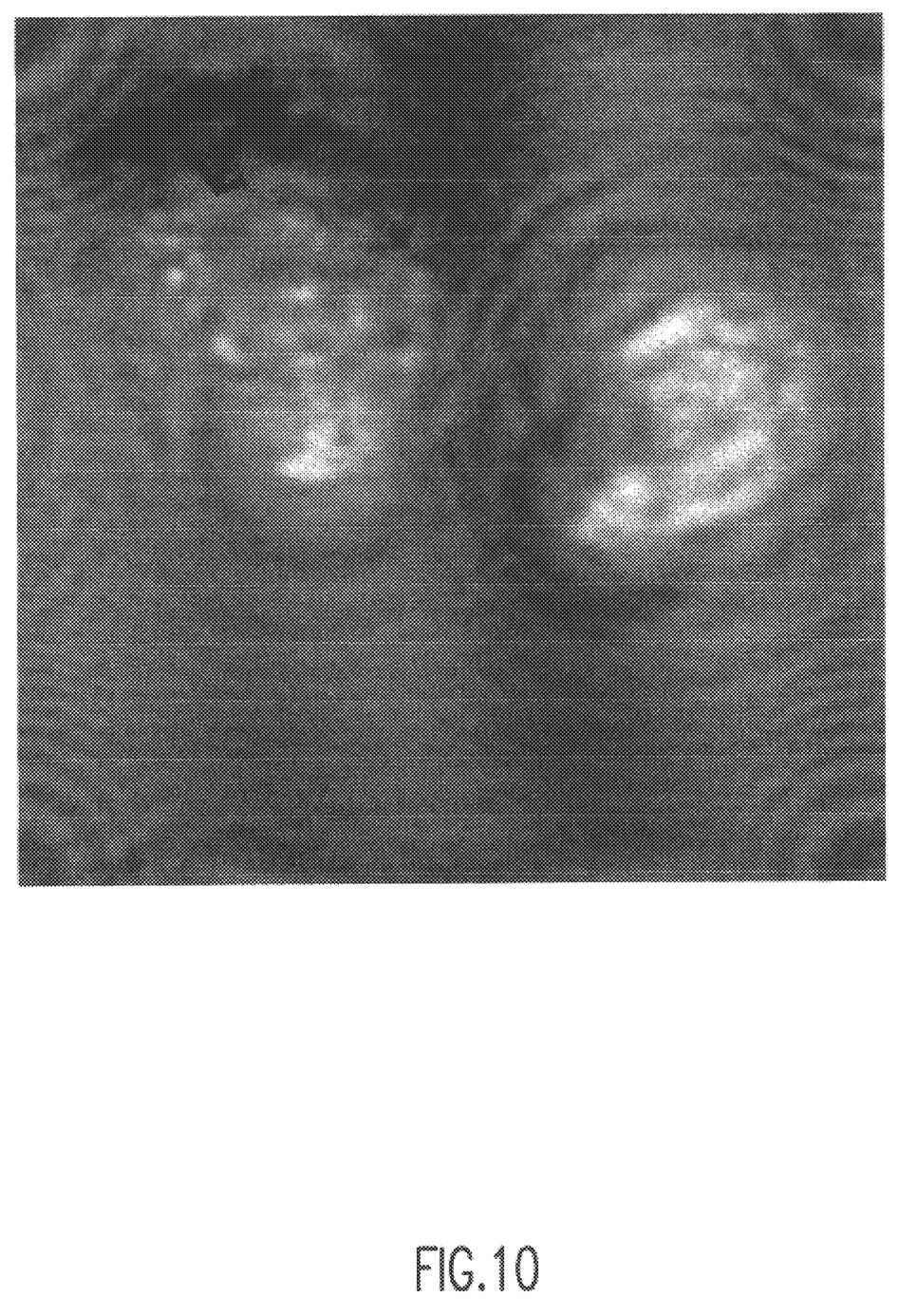
FIG. 10 is a reconstruction of hologram of that shown in FIG. 9 at $z_0$=30 mm (the arrow shows individual fluorescent beads which are distinguishable at this depth)
Figure 11:
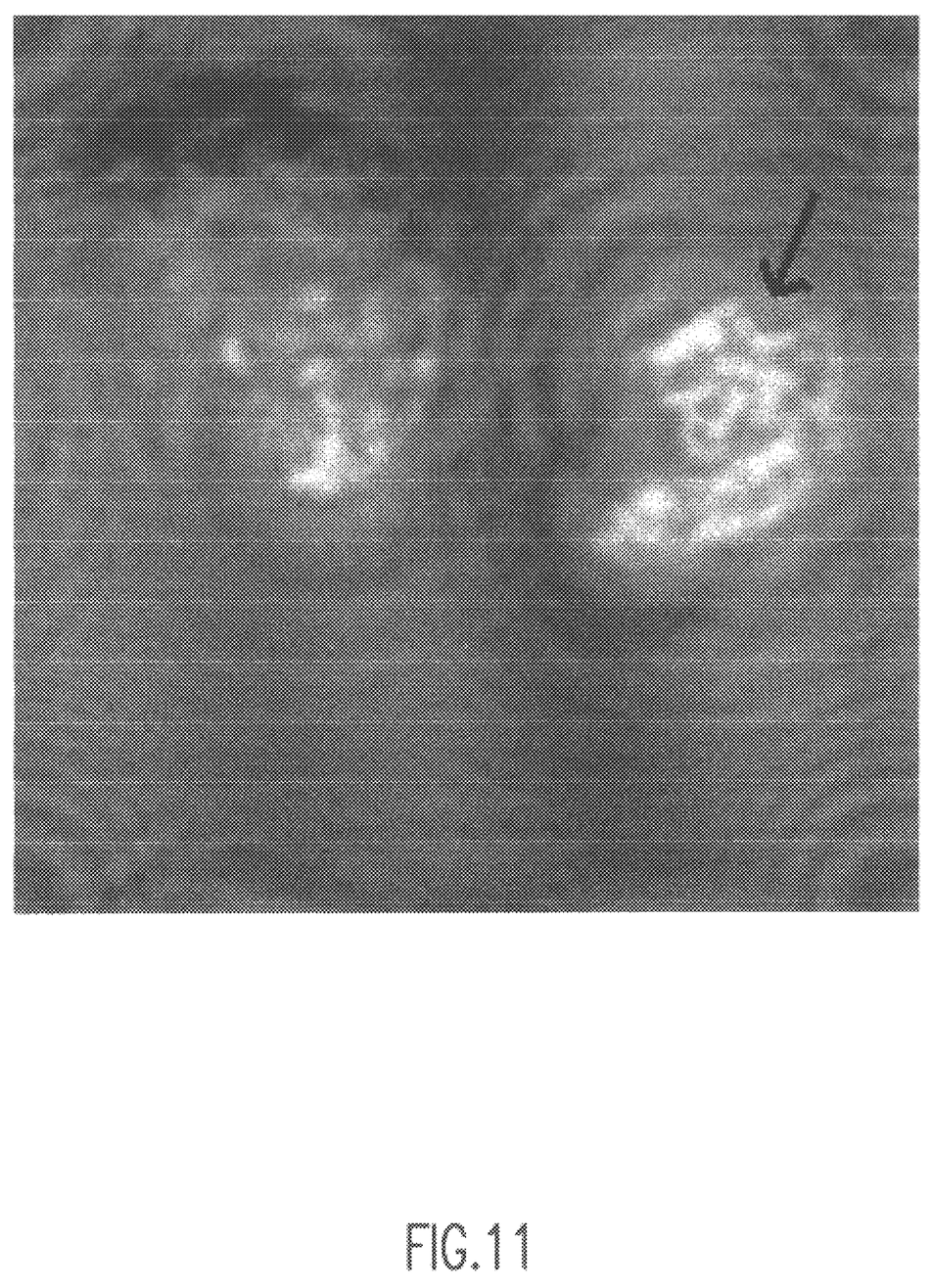
FIG. 11 is a reconstruction hologram of that shown in FIG. 9 at $z_1$=32 mm (again, the arrow shows individual fluorescent beads which are distinguishable at this depth).

In order to demonstrate this aspect, numerical image reconstruction has been performed on the hologram shown in FIG. 9 for two different depths. FIG. 10 is a reconstructed image at $z_0=30.0$ mm, and FIG. 11 is an image reconstruction at $z_1=32.0$ mm. Since the individual attributes in each fluorescent drop are not obvious in FIGS. 10 and 11, arrows have been overlaid on the figures to point out certain areas of interest. In FIG. 10, the fluorescent drop on the left is in better focus than that on the right. The arrow in FIG. 10 points to particular beads which are better imaged when the hologram is reconstructed at depth $z_0$ than in FIG. 11 at depth $z_1$. Similarly, the arrow in FIG. 11 points out a string of four beads which can be individually distinguished when the hologram is reconstructed at depth $z_1$, but which are blurred in the image reconstruction plane $z_0$ in FIG. 10.

One reason the differences between FIGS. 10 and 11 are not more striking lies in the resolving power of the optics used in our experiment. The resolution of the OSH system is limited by the system's numerical aperture (NA), which in turn depends on the focal length of lens $L_1$=150 mm and the diameter of the plane wave focused by lens $L_1$ (D=10 mm). Expected resolution limits for our system can be calculated from the following equations:[22]

$$\Delta x = \frac{\lambda}{2NA} \quad (9)$$

and $$\Delta z = \frac{\lambda}{2NA^2} \quad (10)$$

where Δx is the lateral resolution, Δz is the longitudinal resolution and λ is the wavelength of the laser. The NA of our system is approximately 0.033. Equations 9 and 10 show that with our setup we can expect at best a lateral resolution of Δx=7.7 μm and a longitudinal resolution of Δz=200 μm. The 15 μm bead size is very close to the limit that we can expect to resolve laterally with our current setup, and more than an order of magnitude beyond what we can resolve in the z dimension. At this "proof of principle" stage, our optics are definitely not optimized for resolution. The blame for this situation can be put on the large beamsplitters which must lie between lens $L_1$ and the fluorescent object, and the large and rather cumbersome scanning stage and PMT. When imaging takes place in the air, the practical ljmit for NA is about 0.95. Assuming the setup could be optimized to achieve such a numerical aperture, the theoretical limits of resolution are for 3-D holographic fluorescence microscopy by this method are Δx=0.3 μm and Δz=0.6μm.

We claim:

1. An optical scanning holograpy system which requires only a two dimensional scan to record three-dimensional information from a fluorescent specimen, comprising:

a laser;

a modulator for receiving a beam from said laser and splitting said beam into a first modulated diffracted beam and a second modulated diffracted beam, said second modulated diffracted beam being angularly separated from said first diffracted beam;

means for generating a drive signal for driving said modulator, said drive signal causing said first modulated diffracted beam and said second modulated diffracted beam to be separated by a predetermined frequency;

a lens which forms a spherical wave with one of said first diffracted beam and said second diffracted beam, a beam splitter for combining said first diffracted beam and said second diffracted beam to form a combined beam having an interference pattern, the interference pattern producing an excitation field at said predetermined frequency, said predetermined frequency being a frequency which will cause said fluorescent specimen to exhibit a fluorescent response;

a dichroic beam splitter for passing said combined beam to a fluorescent specimen in a plane substantially perpendicular to the combined beam, the fluorescent specimen fluorescing in response to the excitation field produced by the interference pattern; and a photodetector which detects fluoresced light reflected from said fluorescent specimen and which outputs a current containing three-dimensional information of the fluorescent specimen, wherein said generating means generates said drive signal by mixing a first signal of a first frequency and a second signal of a second frequency, said first frequency and said second frequency lying within an active region of said modulator and being separated by said predetermined frequency.

2. An optical scanning holography system as recited in claim 1, further comprising:

a filter prior to said photodetector which rejects background light from said laser and passes the fluoresced light from the fluorescent specimen.

3. An optical scanning holography system as recited in claim 1 wherein said modulator comprises an acousto-optic modulator which splits said beam into said first diffracted beam and said second diffracted beam using a sound field.

4. An optical scanning holography system as recited in claim 1, wherein said predetermined frequency corresponds to a wavelength which is at least substantially near a peak absorption wavelength of a fluorescent dye in said fluorescent specimen, so that a detectable fluorescent response is produced when said fluorescent specimen is scanned with the excitation field in the interference pattern of said combined beam.

5. An optical scanning holography system as recited in claim 1, wherein said first frequency is substantially greater than said second frequency.

6. An optical scanning holography system as recited in claim 1, wherein said first frequency and said second frequency are radio frequencies.

7. An optical scanning holography system as recited in claim 1, wherein said modulator has a nonuniform frequency response.

8. An optical scanning holography system as recited in claim 1, further comprising:
   means for designating a depth of said fluorescent specimen; and
   means for reconstructing an image of said fluorescent specimen at said depth based on said three-dimensional information.

9. An optical scanning holography system as recited in claim 1, further comprising:
   means for reconstructing a plurality of images of said fluorescent specimen based on said three-dimensional information, each of said plurality of images being at a different depth of said fluorescent specimen; and
   means for serially combining said plurality of images to form a movie.

10. A method for producing at least one image of a specimen containing a fluorescent dye, comprising:
    inputting a laser beam into a modulator;
    generating a driving signal for said modulator that will cause said modulator to split said laser beam into a first modulated beam and a second modulated beam separated by a predetermined frequency;
    combining the first modulated beam and the second modulated beam to form an interference pattern, said interference pattern producing an excitation field at said predetermined frequency, said predetermined frequency being a frequency which will cause said fluorescent specimen to exhibit a fluorescent response;
    scanning said interference pattern in a two-dimensional plane over said specimen, said specimen fluorescing in response to the excitation field produced by said interference pattern;
    detecting fluorescent light reflected from said specimen; and
    deriving from said fluorescent light a current containing three-dimensional information of the specimen;
    wherein said generating step includes mixing a first signal of a first frequency and a second signal of a second frequency said first frequency and said second frequency lying within an active region of said modulator and being separated by said predetermined frequency.

11. The method of claim 10, wherein said predetermined frequency corresponds to a wavelength which is at least substantially near a peak absorption wavelength of a fluorescent dye in said specimen, so that a detectable fluorescent response is produced when said fluorescent specimen is scanned with the excitation field in the interference pattern.

12. The method of claim 10, wherein said second beam is a plane wave, and wherein said interference pattern is generated in accordance with steps that include:
    converting the first modulated beam into a spherical wave beam; and
    combining the spherical wave beam with said second beam.

13. The method of claim 10, wherein said interference pattern is produced in accordance with an incoherent method, so that said three-dimensional information corresponds to a hologram that contains intensity variations of said specimen and is insensitive to phase variations of said specimen.

14. The method of claim 10, further comprising:
    designating a depth of said specimen; and
    reconstructing an image of said specimen at said depth based on said three-dimensional information.

15. The method of claim 10, further comprising:
    reconstructing a plurality of images of said specimen based on said three-dimensional information, each of said plurality of images being at a different depth of said specimen; and
    serially combining said plurality of images to form a movie.

* * * * *